(No Model.)
C. COGNIASSE & D. F. SHULTZ.
AUTOMATIC CAR FENDER.
No. 562,171. Patented June 16, 1896.
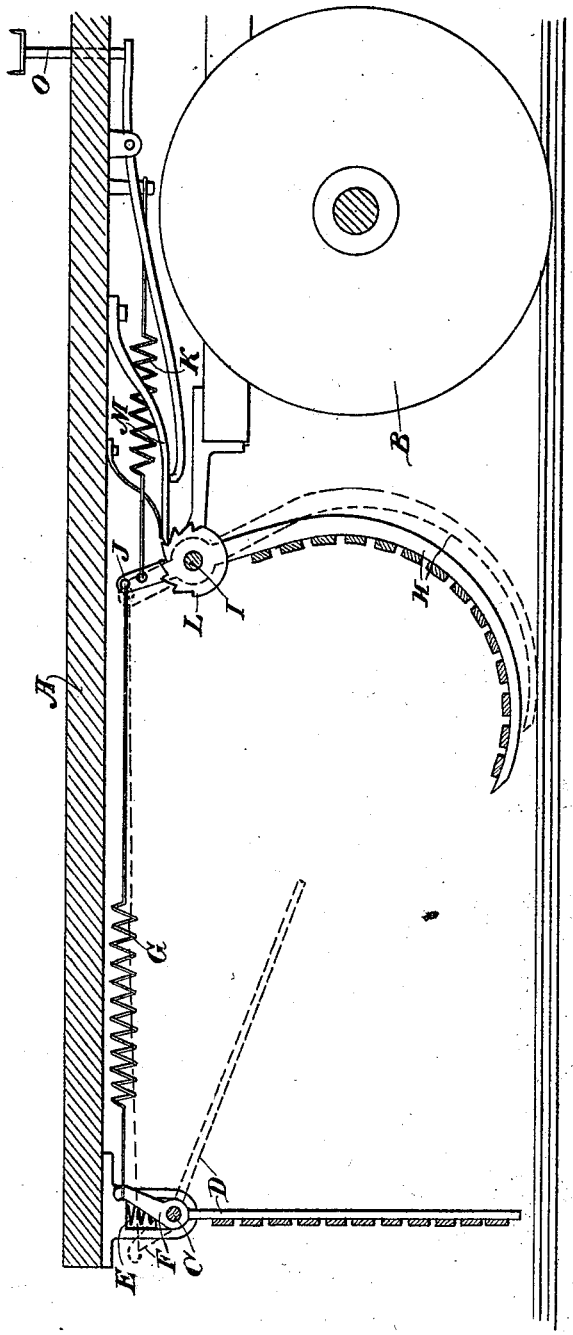
Witnesses,
J. H. Nourse
H. F. Ascheck
Inventors,
Charles Cogniasse
David F. Shultz
By Dewey & Co.
Attys

UNITED STATES PATENT OFFICE.

CHARLES COGNIASSE AND DAVID F. SHULTZ, OF SAN FRANCISCO, CALIFORNIA.

AUTOMATIC CAR-FENDER.

SPECIFICATION forming part of Letters Patent No. 562,171, dated June 16, 1896.

Application filed March 30, 1896. Serial No. 585,437. (No model.)

*To all whom it may concern:*

Be it known that we, CHARLES COGNIASSE and DAVID F. SHULTZ, citizens of the United States, residing in the city and county of San Francisco, State of California, have invented an Improvement in Automatic Car-Fenders; and we hereby declare the following to be a full, clear, and exact description of the same.

Our invention relates to a protecting device for railway-cars.

It consists, essentially, in an automatically-operating fender, and in details of construction which will be more fully explained by reference to the accompanying drawing, in which the figure is a longitudinal section of a car with our fender attached to it.

A represents the floor of the car; B, the bearing-wheels upon which the car travels and with which the car-body is connected by the usual frame or truck.

The front end of the car, or an extension from the truck, projects to a considerable distance beyond the wheels, and upon this extension are boxes in which the shaft C is journaled. This shaft has fixed to it a fender D, which may be of any suitable shape and material. In the present case we have shown it rectangular in form, extending downward from its shaft to a point as near the track and road-bed as possible, while allowing sufficient space for the vertical movement of the car or the truck from which it may be supported.

Any suitable material may be used for the construction of this fender, either a light elastic framework, wire gauze or netting or soft fibrous material stretched upon suitable frames, the object being to provide a device which when it strikes a body will not be so hard as to injure it by the force of the blow. The journals in which the shaft turn are movable in elongated vertical slots, as shown, and springs E act upon the caps of the boxes in which the shaft turns, so as to normally hold the shaft at the bottom of the elongated slots, but if by any reason the fender should strike an obstruction which must pass beneath it, these springs yield and allow the whole structure to rise temporarily until it has passed over the obstruction, when they force it back to its normal position.

F is an arm extending upwardly from the shaft, and connected with it is a spring G. The action of this spring is to normally hold the fender in an approximately vertical position, but if the fender strikes any body, the spring will yield and allow the fender to swing backward and upward, as shown in dotted lines. At a point in front of the wheels and behind this swinging fender is a receiving-fender H, which is, in the present case, shown as made in segmental form, and this may also be made of any suitable soft material or netting supported upon sufficiently rigid frames to maintain its shape and position. The upper ends of these frames are fixed to a journal-shaft I, which turns in boxes beneath the car-body or preferably supported from the trucks, so as to have the minimum of vertical movement. The lower end of this fender is normally carried at a short distance above the surface of the ground and the track. The rocker-arm J extends upwardly from this shaft, and the spring G, which connects with the rocker-arm F of the forward shaft, is also connected with this arm J. Another spring K connects with this rocker-arm and extends rearwardly and is attached at some suitable fixed point. This spring acts to draw the upper end of this second fender backwardly, and correspondingly throw the lower end to the front slightly upward, so as to be in position to clear the road-bed under ordinary conditions. Whenever a body is struck by the fender D, this fender will be caused to swing backwardly about its axis and pulling upon the spring G, which connects it with the rocker-arm J of the rearmost fender, it pulls this arm forward, thus swinging the receiving-fender H backward and depressing the lower edge until it is so close to the track that nothing can pass beneath it. The spring K yields to allow of this movement. Upon the shaft of the receiving-fender H is fixed a ratchet-wheel L, and this is engaged by a spring-actuated pawl M, so that when the fender swings back this pawl retains it in position until released. After the car is stopped and the obstruction removed, the pawl is released by pressure upon a pin O, which projects upwardly through the floor of the car within reach of the operator, and this allows the fender H to swing forward into its normal position.

The front fender D will naturally take its normal position as soon as the obstruction has been passed by it. In this manner it will be seen that by reason of the swinging front fender the rearmost one, which is to receive the obstruction and prevent it passing beneath the car-wheels, will always be automatically brought into position to receive the body, before the latter can pass the first fender and reach it.

Having thus described our invention, what we claim as new, and desire to secure by Letters Patent, is—

1. In a safety device for cars, a swinging fender depending from the front end of the car, a curved receiving-fender depending at a point in rear of the first fender and in front of the wheels of the car, a spring by which the lower edge of the receiving-fender is normally tilted upward above the surface of the street, rocker-arms projecting upwardly from the shafts of each of the fenders, an elastic connection between the two whereby the swinging of the front fender also moves the receiving-fender with its edge in close proximity to the surface and a pawl-and-ratchet mechanism whereby the receiving-fender is locked in this position until released.

2. In a safety device for cars, a receiving-fender suspended from a shaft journaled upon the car-frame, an arm projecting upwardly from a shaft and a spring connecting with said arm whereby the lower edge of the receiving-fender is normally tilted upwardly out of contact with the surface, a second swinging fender depending from the car-frame at a point in front of the receiving-fender with its lower edge normally close to the surface beneath, an arm extending upwardly from the shaft of said fender, an elastic connection between said arm and the arm of the receiving-fender whereby the swinging of the foremost fender by contact with an obstruction acts to depress the edge of the receiving-fender, a pawl-and-ratchet mechanism whereby the latter fender is locked in position when its lower edge has been depressed and journal-boxes for the shaft of the foremost fender movable in vertically-slotted bearings whereby the foremost fender is allowed to yield and move upwardly when the lower edge contacts with immovable obstructions.

In witness whereof we have hereunto set our hands.

CHARLES COGNIASSE.
   DAVID F. SHULTZ.

Witnesses:
 F. W. HERRING,
 J. I. MCALISTER.